Patented Dec. 13, 1938

2,140,163

UNITED STATES PATENT OFFICE

2,140,163

MEAT COOKING

Harry H. McKee, Chicago, Ill., assignor to Industrial Patents Corporation, Chicago, Ill., a corporation of Delaware No Drawing. Original application May 6, 1933, Serial No. 669,675. Divided and this application April 12, 1935, Serial No. 15,988

3 Claims. (Cl. 99—107)

This invention relates to a method of treating meat products and to the product of such method.

This application is a division of my application entitled "Method of cooking meats," filed May 6, 1933, Serial No. 669,675.

One of the objects of the present invention is to provide a method for treating meat products. Another object is to provide a method for treating hams whereby a cooked, smoked ham is produced which is exceptionally tender, having unusual flavor. Another object of the invention is to provide a method whereby hams may be simultaneously cooked and smoked producing thereby a product unlike the product of separate cook and smoke.

Other objects of the invention will be apparent from the description and claims which follow.

It will be understood that the practice of the invention as applied to hams is herein described by way of illustration and not by way of limitation, the invention being applicable to all types of meat products.

The present invention is concerned with a specific procedure for securing a "thorough cook" of the nature described and claimed in my said application, Serial No. 669,675, and a complete understanding of the present invention requires a discussion of the process therein disclosed.

I will discuss as an example, treatment of sweet pickle hams. I first soak the hams coming from pickle for from eight to twelve hours depending upon the average temperature. In case of bone-in hams after removal from soaking vats, the individual hams are hung in the smoke house or oven on standard meat trolleys. The hams may be encased in a stockinette and hung in accordance with conventional practice or in any other desired manner.

When the smokehouse is filled with hams, the air temperature is raised to 190° to 195° F. and the humidity is raised to the saturation point by the use of an open steam line in the oven. Smoke is applied simultaneously. The temperature of from 190° to 195° is maintained with the saturated air condition and a good smudge of smoke until the inside temperature of the hams has been raised to about 125°, which usually occurs between three to six hours from the beginning of the treatment. The air temperature is then reduced to 160° to 165° F. and the humidity is lowered, corresponding to the reduction in air temperature, the humidity being maintained, however, at the saturation point for the new temperature. The temperature of from 160° to 165° is then maintained for an additional ten to thirteen hours, making the total smoking and cooking time approximately sixteen hours. At the end of the sixteen hours the approximate inside temperature of the ham is from 156° to 164° F.

A boneless ham may be treated to the same process after pressing. Boneless hams are preferably treated to the process of the present invention by being placed in the smokehouse while contained in the usual type of cooking container designed for cooking boneless hams in water. After the boneless hams in such containers have been in the heated smokehouse for a few hours the natural juices of the meat begin to cook out and come up above the cover. These juices are necessarily subjected to the action of the smoke smudge and absorb the smoke flavor which is carried down into the meat during the smoking and cooking process. It is desirable to chill the ham in the container with the ham submerged in its own natural juice, when much of the cooked out natural juice is reabsorbed by the meat.

Thus, it will be seen that the present invention involves simultaneous cooking and smoking and offers an extremely satisfactory method of producing a smoked boneless cooked ham.

It is desirable to filter the smoke with any suitable filtering material to remove dirt and other undesirable elements.

After the hams have been thus simultaneously smoked and cooked, they may be removed from the smokehouse and after being chilled for approximately two hours, rubbed with sugar and browned to the desired degree with a hot flame. Hams so treated are then chilled in a temperature from 34° to 38° F. for about twenty-four hours before shipping.

The present invention presents many advantages in the cooking of hams since it contemplates simultaneously smoking and cooking and permits cooking for longer periods of time, that is, from fifteen to eighteen hours with temperatures from 165° to 195° F. with less resulting shrink in the case of bone-in hams than would result from cooking in water from three and one-half to four hours at a temperature of from 155° to 160°.

The new combination of high temperature, humid air and smoke results in increased tenderness and improvement in flavor.

It should be noted that during the first three or four hours of the treatment very high temperatures are used. During this time, due to the high temperature and high humidity, gelatine is released from the skin and surfaces of the ham and forms a coating thereover which acts as a seal preventing the escape of moisture and natural flavors, thus bringing about the result of low shrink and improved flavor.

The remaining cooking period at the lower temperatures thoroughly cooks the meat encased in its natural gelatine coating, bringing about a more thorough cook than that which has previously been thought possible. The total time of cooking varies, of course, with the size of the ham varying from approximately fourteen hours for a ten pound ham to approximately twenty-two hours for a twenty pound ham. In all cases the cook is carried on until the entirely new flavor, characteristic of the product of the present application, is brought about. This condition, for want of a better term, I call "thorough cook". However, it must be distinguished from mere long subjecting of the ham to the action of heat, since by ordinary methods, hams so long subjected to heat would be overcooked. If cooked in air, it would be dried, if in water, it would be disintegrated, at least in part.

Among the many products which may be advantageously treated in accordance with this invention are bone-in hams, boneless hams, spiced hams, lunch meat, liver cheese, bologna, minced ham, pork tongue, beef tongue, beef brisket, picnics and the like.

In all cases the process would be the same as has been described for hams in the foregoing specification. The cooking time of the various products would vary from eight to eighteen hours, depending upon the size of the container in which the product is cooked. In every case the cooking time would be from two to three times longer and at temperatures from 10° to 35° higher than any cooking schedule that has been used on these products in the past.

I have found that any of these products when processed at these high temperatures in the presence of smoke and saturated air for the long period of time in which I keep them in the combined cooking and smoking process, develop a very unusual and desirable flavor entirely different from any flavor which has been previously produced by other methods of cooking these products.

As used in the claims the term "thoroughly cooked" indicates a condition secured by subjecting the meat to the method of cooking described in the foregoing specification and involves a time element relatively longer than usual for cooking the products in question; that is, at least twice as long as would be considered proper in ordinary cookery.

I claim:

1. The method of cooking meat which comprises placing the meat in a container under pressure, the cover of said container being positioned below the top of the sides thereof and provided with a space between the cover and sides whereby juices may rise above said cover, subjecting the meat while in said container to the action of heat, smoke and steam whereby natural juices of the meat cook out and come up above the cover, absorb smoke flavor to be carried down into the meat during the smoking and cooking process, cooking until the meat is thoroughly cooked and thereafter chilling and permitting reabsorption of juice by the meat.

2. As a new article of manufacture, a product prepared in accordance with the method of claim 1.

3. The method of cooking meat which comprises thoroughly cooking the meat in its own juice without added moisture by subjecting the meat in a suitable container to the action of heat and smoke in a saturated atmosphere, the atmosphere being maintained at from 190° to 195° F. until the inside temperature of the meat reaches approximately 125° F., the temperature being then reduced to from 160° to 165° F. and being maintained at this temperature until the meat is thoroughly cooked, during which cooking operation the natural juices of the meat rise above the meat and thereafter permitting reabsorption of the juice by the meat.

HARRY H. McKEE.